(12) United States Patent
Aubert

(10) Patent No.: US 11,163,622 B1
(45) Date of Patent: Nov. 2, 2021

(54) WEB APPLICATION IMPLEMENTING A SHARED SET OF IDENTIFIERS FOR HANDLING LINKS TO WEB APPLICATION PLUGINS

(71) Applicant: Dell Products L.P., Round Rock, TX (US)

(72) Inventor: Raphaël Aubert, Montreal (CA)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/025,457

(22) Filed: Sep. 18, 2020

(51) Int. Cl.
G06F 9/54 (2006.01)
G06F 9/445 (2018.01)
G06F 16/955 (2019.01)

(52) U.S. Cl.
CPC .......... *G06F 9/547* (2013.01); *G06F 9/44526* (2013.01); *G06F 16/9558* (2019.01)

(58) Field of Classification Search
None
See application file for complete search history.

(56) References Cited

U.S. PATENT DOCUMENTS

| 9,344,549 | B2 * | 5/2016 | Davis | H04M 1/72445 |
| 10,558,473 | B2 * | 2/2020 | Klemenz | G06F 9/44521 |
| 10,949,331 | B1 * | 3/2021 | Aubert | G06F 16/381 |
| 10,997,269 | B1 * | 5/2021 | Aubert | G06F 11/3051 |
| 2003/0154239 | A1 | 8/2003 | Davis et al. | |
| 2007/0147306 | A1 | 6/2007 | Halpern | |
| 2011/0145360 | A1 | 6/2011 | Sheshagiri et al. | |
| 2012/0166963 | A1 | 6/2012 | Kohli et al. | |
| 2015/0304479 | A1 * | 10/2015 | Davis | H04L 47/72 455/420 |
| 2016/0285958 | A1 | 9/2016 | Das et al. | |
| 2019/0129734 | A1 * | 5/2019 | Yang | G06F 8/20 |

(Continued)

OTHER PUBLICATIONS

Michael Geers, "Micro Frontends—Extending the Microservice Idea to Frontend Development," https://micro-frontends.org/, downloaded Sep. 30, 2019, 6 pages.

(Continued)

*Primary Examiner* — Umut Onat
(74) *Attorney, Agent, or Firm* — Ryan, Mason & Lewis, LLP

(57) ABSTRACT

An apparatus comprises a processing device configured to obtain shared identifiers associated with portions of a web application and to register web application plugins in the web application by defining linkable parts of the web application plugins corresponding to the shared identifiers. The processing device is also configured to receive, from a web application component of the web application, a link request specifying a given one of the shared identifiers and to determine whether any of the defined linkable parts corresponds to the given shared identifier specified in the link request. The processing device is further configured, responsive to determining that a given defined linkable part of a given one of the web application plugins corresponds to the given shared identifier specified in the link request, to generate a given link to the given defined linkable part and to return the given link to the web application component.

20 Claims, 7 Drawing Sheets

(56) References Cited

U.S. PATENT DOCUMENTS

2021/0096853 A1* 4/2021 Aubert ............... G06F 9/44521

OTHER PUBLICATIONS

U.S. Appl. No. 16/673,052 filed in the name of Raphaël Aubert on Nov. 4, 2019, and entitled "Using Web Application Components with Different Web Application Frameworks in a Web Application."
U.S. Appl. No. 16/588,168 filed in the name of Raphaël Aubert on Sep. 30, 2019, and entitled "Migration of Web Applications between Different Web Application Frameworks."
U.S. Appl. No. 16/776,911 filed in the name of Raphaël Aubert on Jan. 30, 2020, and entitled "Integration Testing of Web Applications Utilizing Dynamically Generated Automation Identifiers."
U.S. Appl. No. 16/776,892 filed in the name of Raphaël Aubert on Jan. 30, 2020, and entitled "Access Restriction for Portions of a Web Application."
U.S. Appl. No. 16/776,902 filed in the name of Raphaël Aubert on Jan. 30, 2020, and entitled "Configuration-Based Code Construct for Restriction Checks in Component of a Web Application."

* cited by examiner

WEB APPLICATION IMPLEMENTING A SHARED SET OF IDENTIFIERS FOR HANDLING LINKS TO WEB APPLICATION PLUGINS

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for handling links to web application plugins in a web application using a shared set of identifiers.

In one embodiment, an apparatus comprises at least one processing device comprising a processor coupled to a memory. The at least one processing device is configured to perform the steps of obtaining a plurality of shared identifiers associated with a plurality of portions of a web application and registering two or more web application plugins in the web application. Registering the two or more web application plugins comprises defining linkable parts of the two or more web application plugins corresponding to respective ones of the plurality of shared identifiers. The at least one processing device is also configured to perform the steps of receiving, from a web application component of the web application, a link request specifying a given one of the plurality of shared identifiers and determining whether any of the defined linkable parts of the two or more web application plugins corresponds to the given shared identifier specified in the link request. The at least one processing device is further configured to perform the steps of, responsive to determining that a given defined linkable part of a given one of the two or more web application plugins corresponds to the given shared identifier specified in the link request, generating a given link to the given defined linkable part of the given web application plugin and returning the given link to the web application component.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
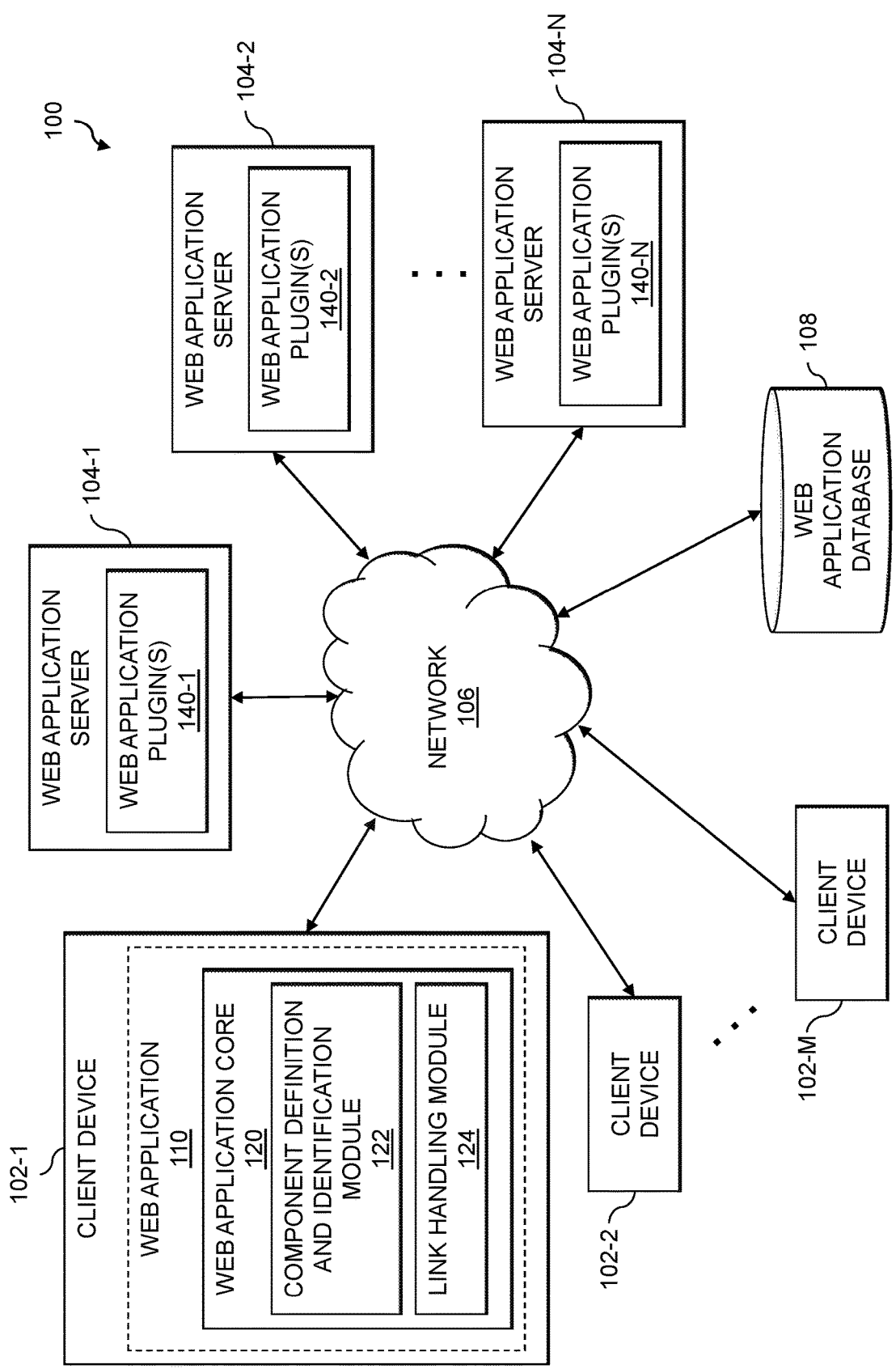
FIG. 1 is a block diagram of an information processing system for handling links to web application plugins in web applications using a shared set of identifiers in an illustrative embodiment.

FIG. 1 shows an information processing system 100 configured in accordance with an illustrative embodiment. The information processing system 100 is assumed to be built on at least one processing platform and provides functionality for handling links to web application plugins in web applications using a shared set of identifiers. The information processing system 100 includes a set of client devices 102-1, 102-2, ... 102-M (collectively, client devices 102) and one or more web application servers 104-1, 104-2, ... 104-N (collectively, web application servers 104) that implement or provide web application plugins 140-1, 140-2, ... 140-N (collectively, web application plugins 140). The client devices 102 and web application servers 104 are coupled via a network 106. Also coupled to the network 106 is a web application database 108, which is configured to store information related to web applications, a shared set of identifiers for objects and locations within web applications, etc.

Each of the client devices 102 is assumed to run a web browser utilized to access one or more web applications, with at least portions of the one or more web applications being hosted by the web application servers 104 as the web application plugins 140. For example, client device 102-1 is assumed to access a web application 110 that has one or more web application components or portions thereof that utilize web application plugins 140 hosted by the web application servers 104. As discussed above, web applications may be implemented as application programs designed for delivery to users over a network (e.g., network 106) through a browser interface. The web application 110 may be implemented as a client-server computer program, in which the client runs in a web browser on the client device 102-1 while the application or portions thereof are hosted in the web application servers 104. For clarity of illustration, however, FIG. 1 shows the web application 110 in dashed outline on the client device 102-1 to indicate that a user of the client device 102-1 is accessing the web application 110.

As used herein, a web application portion or web application component refers to a part of a web application that is divided from other parts of the web application. Each web application portion or web application component of a web application is capable of being served by the web application servers 104 to the client devices 102 independently from one another (e.g., utilizing the web application plugins 140). A particular web application portion or web application component may include one or more pages of the web application, one or more sections of one or more pages of the web application, a set of features of one or more sections or one or more pages of the web application, etc.

The web application servers 104 are entities that serve application code for web applications to the client devices 102, illustratively in the form of the web application plugins 140. In the FIG. 1 example, it is assumed that the web application 110 utilizes different web application plugins 140 hosted by different ones of the web application servers 104 (e.g., at least a first one of the web application plugins 140-1 hosted by the web application server 104-1 and at least a second one of the web application plugins 140-2 hosted by the web application server 104-2). Each of the web application servers 104 is configured to serve or otherwise handle a different subset of a plurality of web application portions or web application components of a particular web application, such as web application 110, via its associated web application plugins 140.

As shown in FIG. 1, client device 102-1 runs a web application core 120 (also referred to herein as an application core 120), which is a part of the web application 110 that is initially loaded by the client device 102-1. The web application core 120 is configured to fetch web application portions or web application components provided using the web application plugins 140 from the web application servers 104. This may include, for example, dynamically loading different ones of the web application plugins 140 on demand as a user navigates to different portions of the web application 110. The web application core 120 is further configured to assemble the web application portions or web application components provided by the web application plugins 140 into the final web application 110 that a user of the client device 102-1 sees. Although not shown in FIG. 1 for clarity of illustration, the client devices 102-2 through 102-M are assumed to implement respective application cores configured to provide functionality similar to that of web application core 120.

Web application portion or web application component metadata refers to the configuration that each web application portion or web application module provides. As described in further detail below, this may be in the form of "entry points" provided as a bundle to the web application core 120. The web application portion or web application component metadata may include or contain various information that the web application core 120 needs to utilize the web application plugins 140.

The client devices 102 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 102 may also or alternately comprise virtualized computing resources, such as VMs, containers, etc.

The client devices 102 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The web application database 108, as discussed above, is configured to store and record information relating to web applications. Such information may include, but is not limited to, information related to web applications, a shared set of identifiers for objects and locations within web applications, etc. as described elsewhere herein.

The web application database 108 in some embodiments is implemented using one or more storage systems or devices associated with the web application servers 104. In some embodiments, one or more of the storage systems utilized to implement the web application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102 and web application servers 104, as well as to support communication between the client devices 102, web application severs 104 and other related systems and devices not explicitly shown.

The client devices 102 and web application servers 104 in the FIG. 1 embodiment are assumed to be implemented using at least one processing device. Each such processing device generally comprises at least one processor and an associated memory, and implements one or more functional modules for controlling certain features of the client devices 102 and web application servers 104. In the FIG. 1 embodiment, for example, the web application core 120 of the client device 102-1 implements a component definition and identification module 122 and a link handling module 124.

The component definition and identification module 122 is configured to obtain a plurality of shared identifiers associated with a plurality of portions of the web application 110 (e.g., location and object definitions for the web application 110). The link handling module 124 is configured to register the web application plugins 140 in the web application 110 by defining linkable parts of the web application plugins 140 that correspond to the shared identifiers. The web application 110 is configured to receive, from web application components thereof, link requests which specify ones of the shared identifiers. The link handling module 124 is configured to determine whether any of the defined linkable parts of the web application plugins 140 correspond to the shared identifiers specified in the link requests. Responsive to determining that a given defined linkable part of a given one of the web application plugins 140 corresponds to a given shared identifier specified in a given one of the link requests, the link handling module 124 generates a given link to the given defined linkable part of the given web application plugin and returns the given link to the web application component. Responsive to determining that none of the defined linkable parts of the web application plugins 140 correspond to the given shared identifier specified in the link request, the link handling module 124 returns an undefined link to the web application component.

It is to be appreciated that the particular arrangement of the client devices 102, web application servers 104, and web application database 108 illustrated in the FIG. 1 embodiment is presented by way of example only, and alternative arrangements can be used in other embodiments. In some embodiments, for example, the web application database 108 may be implemented at least in part internal to the web application servers 104. As another example, the functionality associated with the component definition and identification module 122 and link handling module 124 may be combined into fewer modules, or separated across more modules with the multiple modules possibly being implemented with multiple distinct processors or processing devices.

At least portions of the component definition and identification module 122 and the link handling module 124 may be implemented at least in part in the form of software that is stored in memory and executed by a processor.

It is to be understood that the particular set of elements shown in FIG. 1 for handling links to web application plugins in web applications using a shared set of identifiers is presented by way of illustrative example only, and in other embodiments additional or alternative elements may be used. Thus, another embodiment may include additional or alternative systems, devices and other network entities, as well as different arrangements of modules and other components.

The client devices 102, web application servers 104 and other portions of the system 100 may be part of cloud infrastructure as will be described in further detail below. The cloud infrastructure hosting one or more of the client devices 102 may also host one or more of the web application servers 104.

The client devices 102, web application servers 104 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 102, web application servers 104, and web application database 108, or components thereof, may be implemented on respective distinct processing platforms, although numerous other arrangements are possible. For example, in some embodiments at least portions of the web application servers 104 and web application database 108 are implemented on the same processing platform. The web application database 108 can therefore be implemented at least in part within at least one processing platform that implements at least a portion of the web application servers 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, web application severs 104, and web application database 108, or portions or components thereof, to reside in different data centers. Numerous other distributed implementations are possible. The client devices 102, web application servers 104, and web application database 108 or portions thereof can also be implemented in a distributed manner across multiple data centers.

Additional examples of processing platforms utilized to implement the client devices 102, web application servers 104 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for handling links to web application plugins in web applications using a shared set of identifiers will now be described in more detail with reference to the flow diagram of FIG. 2. It is to be understood that this particular process is only an example, and that additional or alternative processes for handling links to web application plugins in web applications using a shared set of identifiers may be used in other embodiments.

In this embodiment, the process includes steps 200 through 210. These steps are assumed to be performed by the client device 102-1 (e.g., utilizing the web application core 120, component definition and identification module 122, and the link handling module 124) and the web application servers 104. The process begins with step 200, obtaining a plurality of shared identifiers associated with a plurality of portions of a web application. The plurality of shared identifiers may comprise at least one of location and object definitions for respective ones of the plurality of portions of the web application.

In step 202, two or more web application plugins are registered in the web application. Registering the two or more web application plugins comprises defining linkable parts of the two or more web application plugins corresponding to respective ones of the plurality of shared identifiers. Different ones of the two or more web application plugins may use different web application frameworks (e.g., a first one of the two or more web application plugins may utilize a first web application framework and a second one of the two or more web application plugins may utilize a second web application framework different than the first web application framework). In some embodiments step 202 includes restricting access to the defined linkable parts of the two or more web application plugins based at least in part on whether respective ones of the two or more web application plugins have been activated in a user interface of the web application, whether requesting web application components have access rights to respective ones of the two or more web application plugins, combinations thereof, etc. Restricting access to the defined linkable parts may include, for example, making only a subset of the defined linkable parts available in later processing (e.g., as part of the step 208 determination discussed below, such that the shared identifiers in link requests will not be matched to ones of the defined linkable parts that are currently restricted).

Step 202 may include instantiating, for each of the two or more web application plugins, a link generation process that is configured to monitor requests for links to defined linkable parts of that web application plugin. The link generation processes may be instantiated at startup of the web application. The link generation process for at least one of the two or more web application plugins may be instantiated prior to activation of said at least one web application plugin in a user interface of the web application. The link generation processes may be web application framework-agnostic.

In some embodiments, step 202 includes utilizing a global plugin manager of the web application to read metadata of the two or more web application plugins, the metadata defining entry points containing code for generating paths to the defined linkable parts of the two or more web application plugins, and instantiating respective link generation processes configured to generate links to the defined linkable parts of the two or more web application plugins based at least in part on the entry points defined in the metadata. In other embodiments, step 202 includes utilizing a global plugin manager of the web application: to read metadata of the two or more web application plugins, the metadata specifying patterns and replacement for generating paths to the defined linkable parts of the two or more web application plugins; and to generate links to the defined linkable parts of the two or more web application plugins based at least in part on the patterns and replacements in the metadata.

Figure 2:
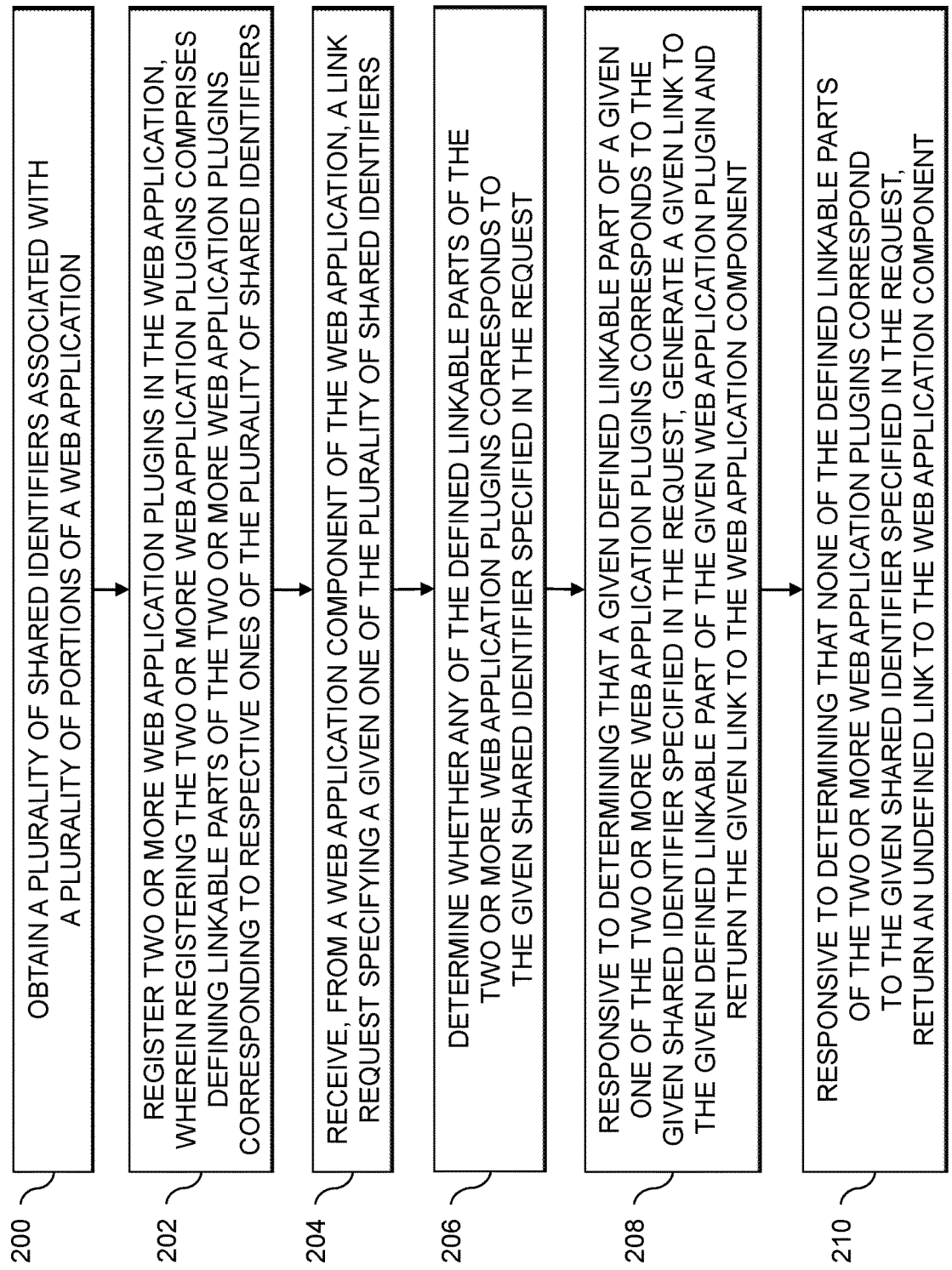
FIG. 2 is a flow diagram of an exemplary process for handling links to web application plugins in a web application using a shared set of identifiers in an illustrative embodiment.

The FIG. 2 process continues with step 204, receiving, from a web application component of the web application, a link request specifying a given one of the plurality of shared identifiers. In step 206, a determination is made as to whether any of defined linkable parts of the two or more web application plugins corresponds to the given shared identifier specified in the link request. Responsive to determining that a given defined linkable part of a given one of the two or more web application plugins corresponds to the given shared identifier specified in the link request, a given link to the given defined linkable part of the given web application plugin is generated and returned to the web application component in step 208. Responsive to determining that none of the defined linkable parts of the two or more web application plugins correspond to the given shared identifier specified in the link request, an undefined link is returned to the web application component in step 210. The undefined link may comprise text which does not link to any of the two or more web application plugins.

In a plugin-based web application architecture, it is challenging to provide a robust and maintainable way to generate links from one part or portion of the web application to another (e.g., from a first plugin of the web application to a second plugin of the web application). In a truly standalone plugin-based web application architecture, the web application may be divided into standalone parts or portions that are handled independently. For example, each standalone part or portion may utilize different repositories, code that is not shared at runtime between plugins, plugins that are added dynamically to the web application, etc. As a result, a given plugin of a web application may not know how other plugins handle internal links of the web application, and thus does not know how to refer to specific parts of the other plugins. Consider, as examples: how to create a link that points to the performance details page of a particular web application in a generic, reusable and maintainable way; how to point to a specific section of the user settings of a particular web application, even if that section moves to a different location and/or plugin at a later time; how to handle potentially missing pages and not display a link (e.g., because the corresponding plugin is not in use, is restricted due to user access rights, etc.); etc.

Illustrative embodiments provide a web application framework-agnostic and low-footprint way for plugins to export how their internal links are created based on a generic object definition (e.g., to define link location). When combined with framework-bound components that use such functionality to automatically handle link computation and display (e.g., static text versus actual links), this makes the process of handling links between plugins of web application seamless in terms of link computation and actual link display.

Figure 3:
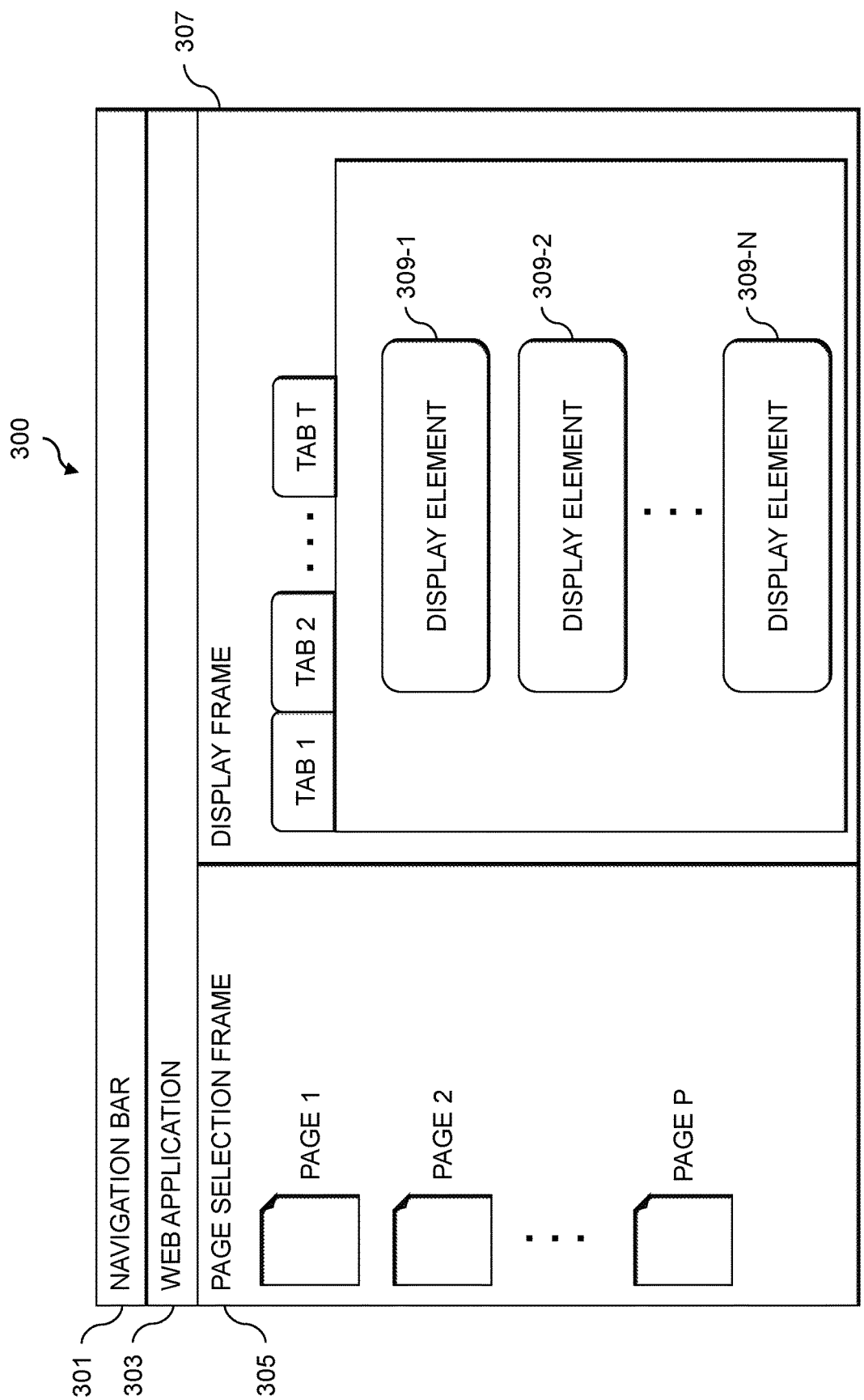
FIG. 3 illustrates a view of different portions of a web application in an illustrative embodiment.

FIG. 3 shows an example layout 300 of a web application that may utilize different web application plugins. The layout 300 includes a navigation bar 301, which may be a portion of a web browser that is utilized to type in or otherwise input uniform resource locators (URLs) to load web application 303. The web application 303 also includes a page selection frame 305, allowing a user to select from pages 1, 2, . . . P to present in the display frame 307. The display frame 307 as shown includes a set of tabs 1, 2, . . . T. When a particular page and tab are selected (e.g., page 1, tab 1) that page or tab gets loaded into the display frame 307, along with a set of display elements 309-1, 309-2, . . . 309-N (collectively, display elements 309). The display elements 309 may comprise charts, plots, tables, visualizations, widgets, etc. The pages, tabs and display elements 309 are examples of what is more generally referred to herein as web application components. A tab or page as a whole also may represent web application components (e.g., a tab of a given page of the web application 303 may itself be a web application component that loads other web application components therein, a page of the web application 303 may itself be a web application component that loads other web application components in different tabs thereof, etc.).

In some embodiments, different ones of the web application components may utilize different web application frameworks. For example, a first one of the web application components may utilize a first web application framework, while a second one of the web application components may utilize a second web application framework different than the first web application framework. The web application components may utilize different web application plugins to provide at least a portion of content for the web application 303. As a particular page, tab or display element is selected by a user of the web application 303, the web application plugins providing content for the web application components of that page, tab or display element may be dynamically loaded into the web application 303 so as to render and display the content. As described elsewhere herein, the web application plugins may link to content of other web application plugins within a given one of the web application components or across different ones of the web application components.

Figure 4:
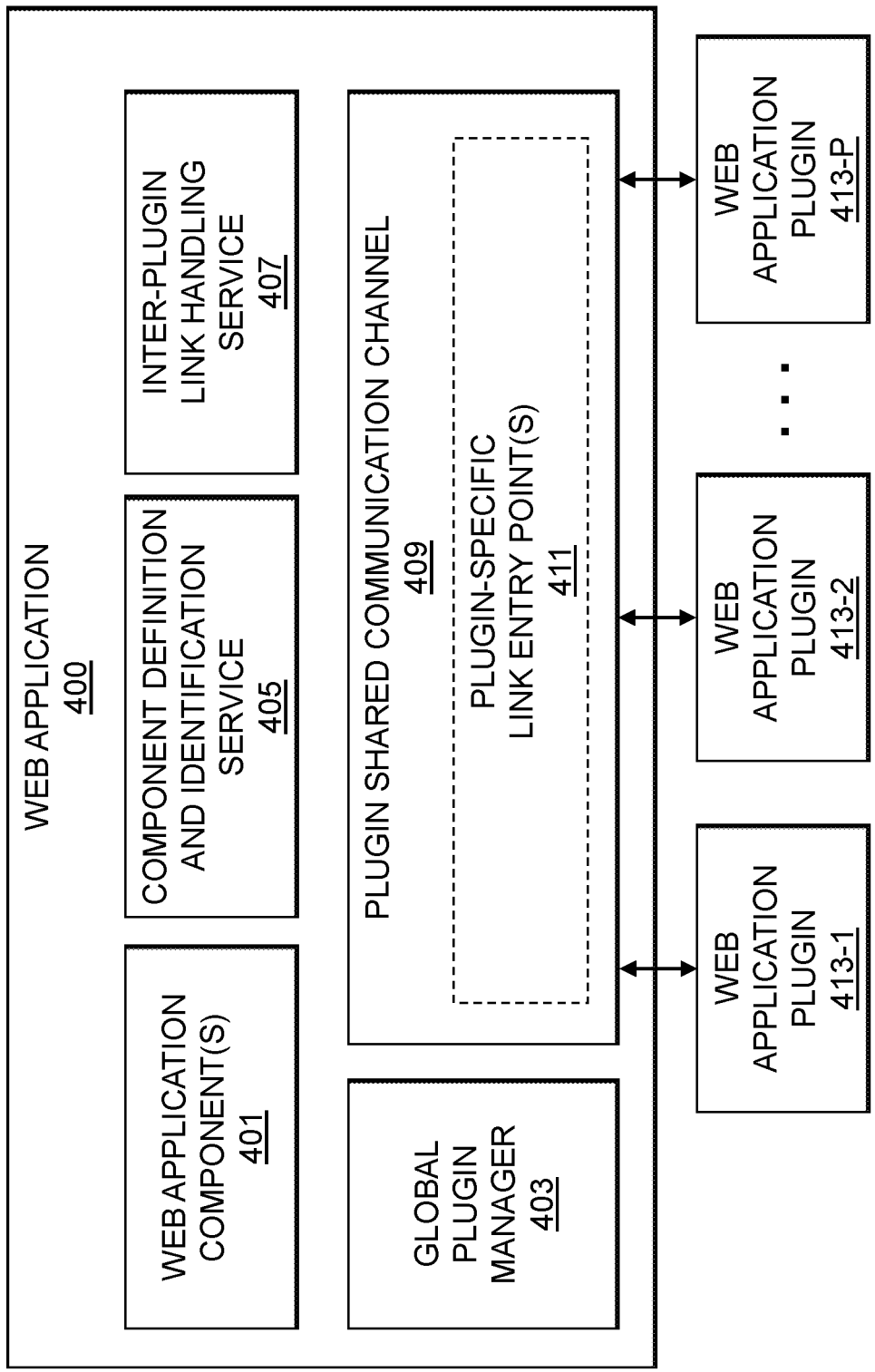
FIG. 4 shows a system for link handling in a web application in an illustrative embodiment.

FIG. 4 illustrates an architecture of a web application 400 that provides functionality for web application plugin link handling. The web application 400 includes various web application components 401 (e.g., pages, tabs, display elements, etc.), along with a global plugin manager 403, a component definition and identification service 405, an inter-plugin link handling service 407, a plugin shared communication channel 409 implementing plugin-specific link entry points 411, and a set of web application plugins 413-1, 413-2, . . . 413-P (collectively, web application plugins 413).

The plugin shared communication channel 409 provides a bridge between the different web application plugins 413 utilized by the web application components 401 of the web application 400. The component definition and identification service 405 provides a shared way of defining and identifying the web application components 401 (e.g., as objects, as locations, etc.). For example, the component definition and identification service 405 may provide a shared way of defining and identifying pages of the web application 400. The plugin-specific link entry points 411 are used by the web application plugins 413 to define and expose web application framework-agnostic processes that compute links (e.g., between different ones of the web application plugins 413, either within a given one of the web application components 401 or across different ones of the web application components 401).

The inter-plugin link handling service 407 is configured to handle calls and display of links by the web application components 401. In some embodiments, the web application 400 is assumed to comprise a shell or base interface that utilizes a given web application framework (which may be the same as or different from the web application frameworks utilized by the web application components 401 and web application plugins 413), and the inter-plugin link handling service 407 may comprise an object that utilizes the given web application framework. In other words, the inter-plugin link handling service 407 is illustratively framework-agnostic as it is brought by the application shell. The inter-plugin link handling service 407 is responsible for handling requests by the web application components 401 for links, and then either answering them (e.g., if links are provided through configuration) or dispatching them to the right processes (e.g., if links are provided through code and specific implementations via the plugin-specific link entry points 411).

As discussed above, the plugin-specific link entry points 411 may be implemented as web application framework-agnostic processes that are illustratively small, ad-hoc processes that are defined in a decentralized way (e.g., at the web application plugin level) while being made available for all web application plugins to use with minimal impact on downloaded content. Combined with framework-based components that provide seamless addition and removal of plugins (e.g., for link display), the complexity is hidden from the end-user.

As used herein, the term "web application framework" refers to a user interface framework that may be utilized to build web application plugins or web application components of web application. Examples of web application frameworks include, but are not limited to, Angular, Vue.js, React, etc.

In a standalone plugin-based web application architecture, a bridge (e.g., a shared communication channel) is usually created between the different web application plugins so that they can communicate and share basic information with one another. In the FIG. 4 embodiment, this bridge is implemented as the plugin shared communication channel 409. The plugin shared communication channel 409 may comprise an object of the web application 400 that is shared between the web application plugins 413 at bootstrap time, with known attributes and methods on this object. This object (e.g., the plugin shared communication channel 409) is leveraged to expose and access link generation utilities (e.g., for the inter-plugin link handling service 407) in the web application 400.

Pages and other web application components 401 in the web application 400 may be based on objects (e.g., for viewing specific system details, user detailed information, etc.) or locations (e.g., a list of systems, a settings page, a help page, etc.). The component definition and identification service 405 is configured to provide a shared set of constants that define locations in a generic way (e.g., "system-details," "settings," etc.), with the shared set of constants being used as a reference by the web application plugins 413 (e.g., via their associated plugin-specific link entry points 411). The component definition and identification service 405 is also configured to provide generic object definitions (e.g., using attributes such as product type, object type, object identifier, etc.). The shared set of constants and generic object definitions provided by the component definition and identification service 405 are utilized by the web application plugins 413 of the web application 400 to identify locations to point to in other ones of the web application plugins 413. For example, a first one of the web application plugins 413-1 may use a call by creating a link to ["system-details", "performance"] for a specific object (e.g., a link to performance information within a system details page or object).

In some embodiments, the shared set of constants and generic object definitions (collectively referred to as shared identifiers) are statically set by the component definition and identification service 405 and remain constant permanently. In other embodiments, the component definition and identification service 405 is configured to allow updates to the shared identifiers. For example, it may be desired to add new shared identifiers over time. In illustrative embodiments, changes to existing ones of the shared identifiers are avoided, as changes to existing ones of the shared identifiers will require the web application plugins 413 to re-map links (e.g., from old ones of the shared identifiers to new shared identifiers). It should be noted, however, that in some cases a change to an existing shared identifier may be required or desired. Further, object definition may be defined such that the shared identifiers apply to all objects handled by the web application 400.

Functionality for link generation processes will now be described. A standalone web application plugin of a web application will typically generate a single entry point (e.g., as a bundle) that is injected when that web application plugin gets activated in the user interface (UI) of the web application. Advantageously, only active web application plugins get their code injected so as to minimize loading times. To maintain such functionality, some embodiments create an additional entry point (e.g., one for each of the web application plugins 413) that is framework-agnostic and as small as possible. Such additional entry points are represented in FIG. 4 as the plugin-specific link entry points 411. The additional entry point for a given one of the web application plugins 413 contains the code required to generate paths to various linkable parts of the given web application plugin. In this way, the link generation code is kept local to the given web application plugin ensuring that any maintenance remains trivial and is bound to a single web application plugin/repository. Generating the additional entry points may be implemented manually, or through packers (e.g., such as webpack) with separate configuration of the two entry points.

Although the plugin-specific link entry points 411 are described above as being framework-agnostic, embodiments are not limited to implementing framework-agnostic plugin-specific link entry points 411. In other embodiments, one or more of the plugin-specific link entry points 411 may be based on or utilize the same web application framework as its corresponding one of the web application plugins 413.

At startup of the web application 400, metadata from all of the web application plugins 413 is read by the global plugin manager 403 (e.g., an entity responsible for loading and unloading the web application plugins 413 on demand for the web application 400). The metadata for each of the web application plugins 413 contains some information about the additional entry point, and the global plugin manager 403 fetches such information and lets the web application plugins 413 register their associated additional entry points as respective ones of the plugin-specific link entry points 411 into the plugin shared communication channel 409. These small processes, in some embodiments, will always remain active. If access to a given one of the web application plugins 413 is restricted, then its additional entry point (or portions thereof, such as specific links) would not be made available or will only be made available to authorized ones of the web application plugins 413. Thus, links for restricted parts of the given web application plugin will not be created, or will only be created for authorized ones of the web application plugins 413.

In some embodiments, for performance, the small processes of the plugin-specific link entry points 411 may be defined in a very generic way (e.g., based on patterns and replacements), so that the web application plugins 413 remain configuration-based. In other words, the link generation process would still be defined in the web application plugin and made part of its metadata definition at build time. This advantageously does not require any additional call from the global plugin manager 403, and the global plugin manager 403 itself could provide a simple link creation implementation based on the patterns and replacements that are part of the metadata definitions of the web application plugins 413

The inter-plugin link handling service 407 may be implemented as a shared link component that uses the web application framework that a given one of the web application plugins 413 relies upon to resolve and display links in the web application components 401 of the web application 400. The shared link component of the inter-plugin link handling service 407 relies on input that is based on the shared identifiers (e.g., the generic object or page definition provided by the component definition and identification service 405). When a given link (e.g., from a first one of the web application plugins 413-1 to a second one of the web application plugins 413-2) is resolved, the shared link component of the inter-plugin link handling service 407 displays the given link. Otherwise, the shared link component of the inter-plugin link handling service 407 displays simple text. In this way, the inter-plugin link handling service 407 is configured to handle in a seamless manner situations where different ones of the web application plugins 413 are added, removed or restricted in the web application 400 without providing dead-end links.

Web application components 401, where applicable (e.g., when requesting a link that it cannot handle on its own and requires use of one of the web application plugins 413), provides an expected object or page definition as input. The framework-bound component uses a service (e.g., the inter-plugin link handling service 407) to reach the plugin shared communication channel 409 and request a link generation for the object. Each of the registered plugin-specific link generation entry points 411 (also referred to herein as registered link generation processes) will listen to that request and check if it knows how to generate the requested link. If the registered link generation process knows how to generate the requested link it will and send that back to the requesting web application component 401 (e.g., via the inter-plugin link handling service 407). If no link generation process knows how to generate the requested link, an undefined link will be sent back to the requesting web application component 401 (e.g., by the inter-plugin link handling service 407). Based on the received link value, the web application component 401 will choose what to display (e.g., simple text, a selectable link, etc.).

Figure 5:
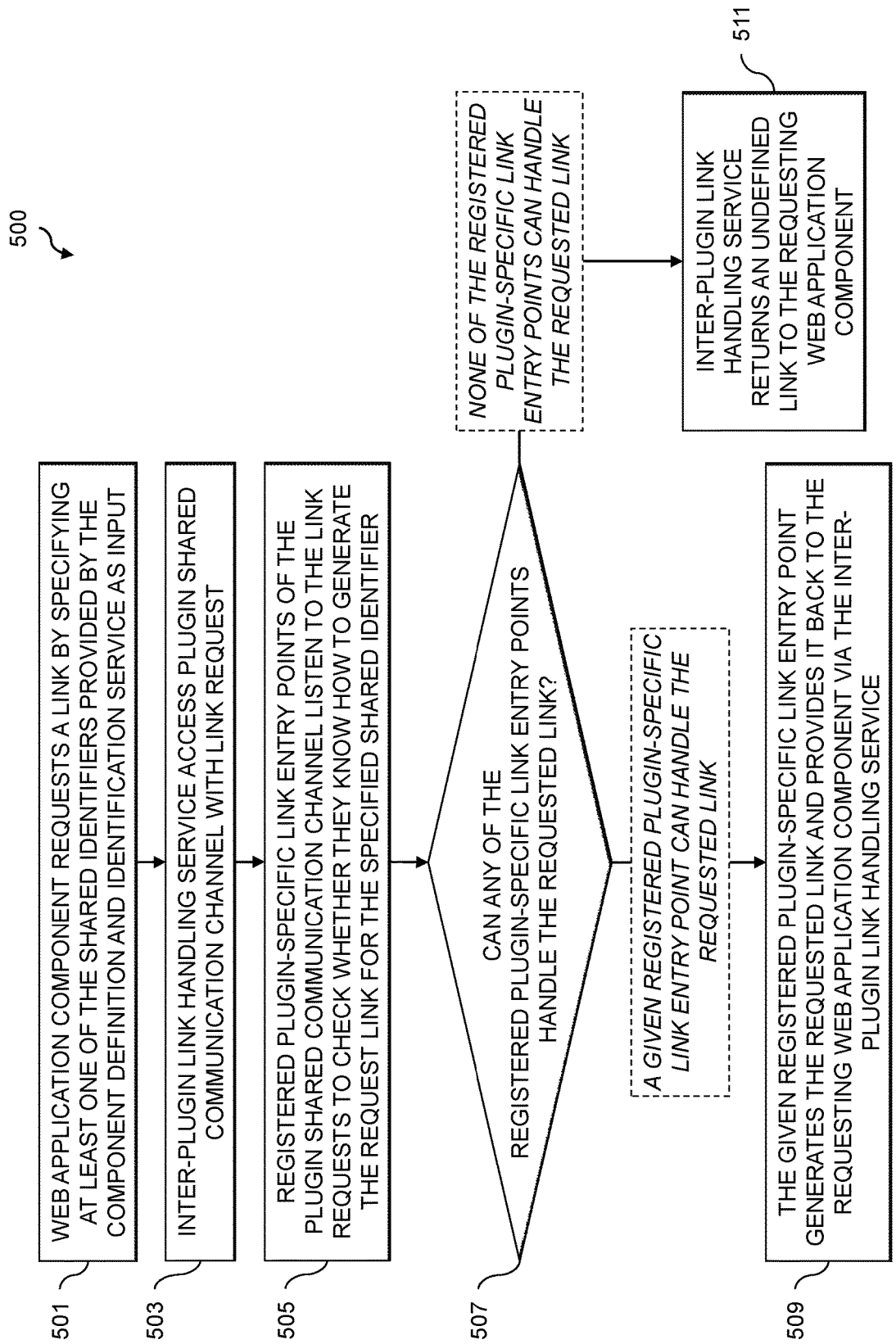
FIG. 5 show a process flow for link handling using the FIG. 4 system in an illustrative embodiment.

FIG. 5 illustrates a process flow 500 for link generation using the FIG. 4 architecture. In step 501, one of the web application components 401 requests a link by specifying at least one of the shared identifiers that are provided by the component definition and identification service 405 as input. In step 503, the inter-plugin link handling service 407 access the plugin shared communication channel 409 with the link request. Registered plugin-specific link entry points 411 of the plugin shared communication channel 409 listen to link requests received from the inter-plugin link handling service 407 in step 505. In step 507, a determination is made as whether any of the registered plugin-specific link entry points is able to handle the requested link. If a given one of the registered plugin-specific link entry points can handle the requested link, the process flow 500 proceeds to step 509 where the given registered plugin-specific link entry point generates the requested link and provides it back to the requesting web application component 401 via the inter-plugin link handling service 407. If none of the registered plugin-specific link entry points are able to handle the requested link, the process flow 500 proceeds to step 511 where the inter-plugin link handling service 407 returns an undefined link to the requesting web application component 401.

Illustrative embodiments provide various advantages relative to conventional approaches. For example, conventional approaches that hardcode links in a web application are simple to implement but are difficult to maintain as it becomes tedious to run through all existing code to find the hardcoded links when they need to be updated. For this reason, such an approach is also very brittle. The techniques described herein, however, do not rely on hardcoding links. Instead, illustrative embodiments provide a single place to generate links within the web application plugins that serve them, which is much easier to test and maintain. As another example, conventional approaches may use convention-based link definition which is a form of hardcoded links but with stricter rules. Illustrative embodiments may also rely on conventions, but any change or addition has no impact as the links are not hardcoded providing easier testing and maintenance.

Other conventional approaches may utilize a centralized repository of links or link creation tools, which is also quite difficult to maintain and cleanup. For example, it may be difficult to determine if a particular link is still used, to determine if the utility is called with the right arguments, etc.

Further, the centralized repository needs to be updated every time something changes, making the maintenance of the plugin that defines the links more complex. Further, having to update multiple repositories simultaneously quickly becomes burdensome, especially in a DevOps (e.g., a combined software development (Dev) and IT operations (Ops)) environment. Illustrative embodiments, however, keep the link definition and creation at the plugin level, one the same repository. Cleanup is also easier as the internal plugin routing and the link creation live side-by-side.

Some conventional approaches rely on monolithic web applications which do not have such challenges, but this is at the cost of flexibility and is not compatible with a plugin-based web application architecture. Illustrative embodiments are advantageously compatible with plugin-based web application architectures and offer much more flexibility when it comes to updating, adding, removing or restriction parts of web applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for handling links to web application plugins in web applications using a shared set of identifiers will now be described in greater detail with reference to FIGS. 6 and 7. Although described in the context of system 100, these platforms may also be used to implement at least portions of other information processing systems in other embodiments.

Figure 6:
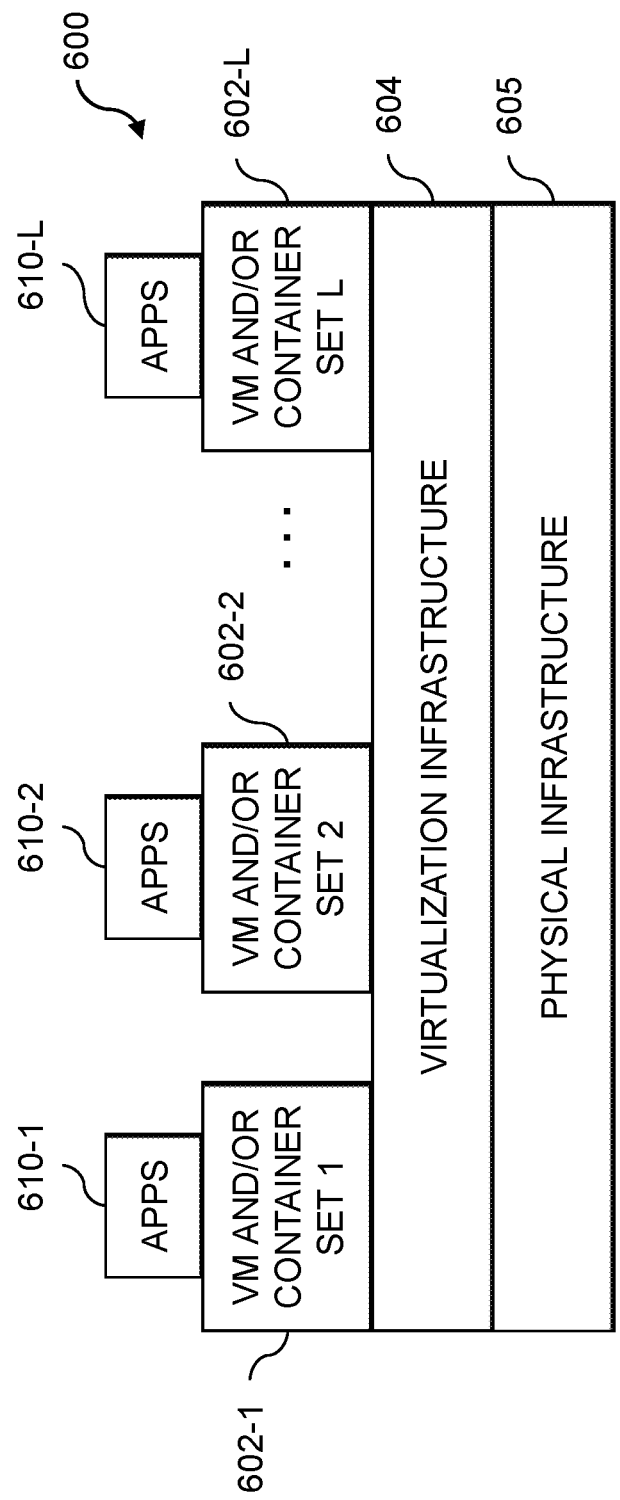
FIGS. 6 and 7 show examples of processing platforms that may be utilized to implement at least a portion of an information processing system in illustrative embodiments.
Figure 7:
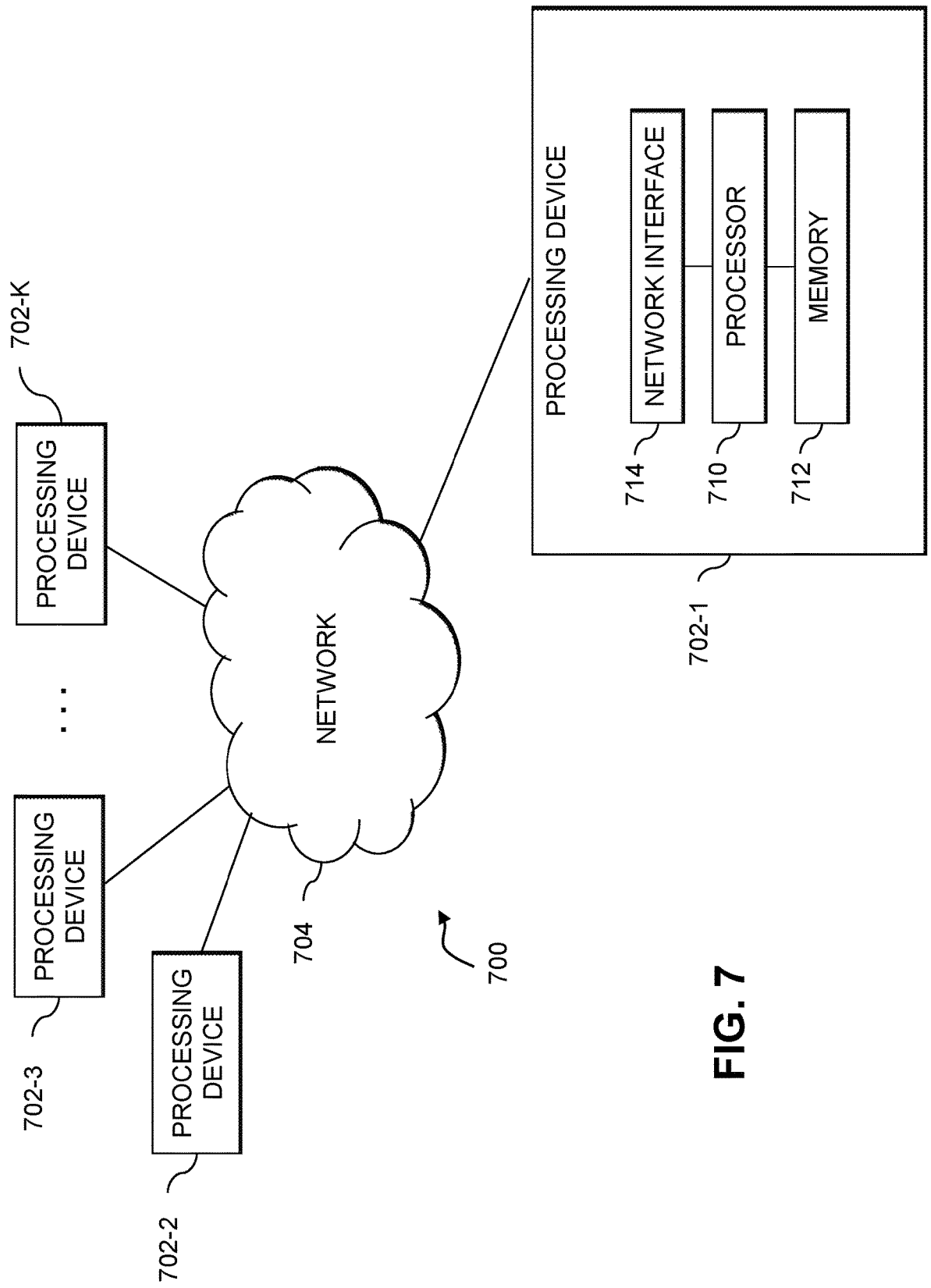

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for handling links to web application plugins in web applications using a shared set of identifiers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, web application portions, configuration metadata, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
       obtaining a plurality of shared identifiers associated with a plurality of portions of a web application;
       registering two or more web application plugins in the web application, wherein registering the two or more web application plugins comprises defining linkable parts of the two or more web application plugins corresponding to respective ones of the plurality of shared identifiers;
       receiving, from a web application component of the web application, a link request specifying a given one of the plurality of shared identifiers;
       determining whether any of the defined linkable parts of the two or more web application plugins corresponds to the given shared identifier specified in the link request; and
       responsive to determining that a given defined linkable part of a given one of the two or more web application plugins corresponds to the given shared identifier specified in the link request, generating a given link to the given defined linkable part of the given web application plugin and returning the given link to the web application component.

2. The apparatus of claim 1 wherein the at least one processing device is configured to perform the step of, responsive to determining that none of the defined linkable parts of the two or more web application plugins correspond to the given shared identifier specified in the link request, returning an undefined link to the web application component.

3. The apparatus of claim 2 wherein the undefined link comprises text which does not link to any of the two or more web application plugins.

4. The apparatus of claim 1, wherein a first one of the two or more web application plugins utilizes a first web application framework and a second one of the two or more web application plugins utilizes a second web application framework different than the first web application framework.

5. The apparatus of claim 1 wherein the plurality of shared identifiers comprises location definitions for respective ones of the plurality of portions of the web application.

6. The apparatus of claim 1 wherein the plurality of shared identifiers comprises object definitions for respective ones of the plurality of portions of the web application.

7. The apparatus of claim 1 wherein registering the two or more web application plugins comprises restricting access to the defined linkable parts of the two or more web application plugins based at least in part on whether respective ones of the two or more web application plugins have been activated in a user interface of the web application.

8. The apparatus of claim 1 wherein registering the two or more web application plugins comprises restricting access to the defined linkable parts of the two or more web application plugins based at least in part on whether requesting web application components have access rights to respective ones of the two or more web application plugins.

9. The apparatus of claim 1 wherein registering the two or more web application plugins in the web application comprises instantiating, for each of the two or more web application plugins, a link generation process that is configured to monitor requests for links to defined linkable parts of that web application plugin.

10. The apparatus of claim 9 wherein the link generation processes are instantiated at startup of the web application.

11. The apparatus of claim 9 wherein the link generation process for at least one of the two or more web application plugins is instantiated prior to activation of said at least one web application plugin in a user interface of the web application.

12. The apparatus of claim 9 wherein the link generation processes are web application framework-agnostic.

13. The apparatus of claim 1 wherein registering the two or more web application plugins in the web application comprises:
    utilizing a global plugin manager of the web application to read metadata of the two or more web application plugins, the metadata defining entry points containing code for generating paths to the defined linkable parts of the two or more web application plugins; and
    instantiating respective link generation processes configured to generate links to the defined linkable parts of the two or more web application plugins based at least in part on the entry points defined in the metadata.

14. The apparatus of claim 1 wherein registering the two or more web application plugins in the web application comprises utilizing a global plugin manager of the web application:
    to read metadata of the two or more web application plugins, the metadata specifying patterns and replacement for generating paths to the defined linkable parts of the two or more web application plugins; and to generate links to the defined linkable parts of the two or more web application plugins based at least in part on the patterns and replacements in the metadata.

15. A computer program product comprising a non-transitory processor-readable storage medium having stored therein program code of one or more software programs, wherein the program code when executed by at least one processing device causes the at least one processing device to perform steps of:

obtaining a plurality of shared identifiers associated with a plurality of portions of a web application;

registering two or more web application plugins in the web application, wherein registering the two or more web application plugins comprises defining linkable parts of the two or more web application plugins corresponding to respective ones of the plurality of shared identifiers;

receiving, from a web application component of the web application, a link request specifying a given one of the plurality of shared identifiers;

determining whether any of the defined linkable parts of the two or more web application plugins corresponds to the given shared identifier specified in the link request; and responsive to determining that a given defined linkable part of a given one of the two or more web application plugins corresponds to the given shared identifier specified in the link request, generating a given link to the given defined linkable part of the given web application plugin and returning the given link to the web application component.

16. The computer program product of claim 15 wherein registering the two or more web application plugins in the web application comprises:

utilizing a global plugin manager of the web application to read metadata of the two or more web application plugins, the metadata defining entry points containing code for generating paths to the defined linkable parts of the two or more web application plugins; and instantiating respective link generation processes configured to generate links to the defined linkable parts of the two or more web application plugins based at least in part on the entry points defined in the metadata.

17. The computer program product of claim 15 wherein registering the two or more web application plugins in the web application comprises utilizing a global plugin manager of the web application:

to read metadata of the two or more web application plugins, the metadata specifying patterns and replacement for generating paths to the defined linkable parts of the two or more web application plugins; and to generate links to the defined linkable parts of the two or more web application plugins based at least in part on the patterns and replacements in the metadata.

18. A method comprising steps of:

obtaining a plurality of shared identifiers associated with a plurality of portions of a web application;

registering two or more web application plugins in the web application, wherein registering the two or more web application plugins comprises defining linkable parts of the two or more web application plugins corresponding to respective ones of the plurality of shared identifiers;

receiving, from a web application component of the web application, a link request specifying a given one of the plurality of shared identifiers;

determining whether any of the defined linkable parts of the two or more web application plugins corresponds to the given shared identifier specified in the link request; and responsive to determining that a given defined linkable part of a given one of the two or more web application plugins corresponds to the given shared identifier specified in the link request, generating a given link to the given defined linkable part of the given web application plugin and returning the given link to the web application component;

wherein the method is performed by at least one processing device comprising a processor coupled to a memory.

19. The method of claim 18 wherein registering the two or more web application plugins in the web application comprises:

utilizing a global plugin manager of the web application to read metadata of the two or more web application plugins, the metadata defining entry points containing code for generating paths to the defined linkable parts of the two or more web application plugins; and instantiating respective link generation processes configured to generate links to the defined linkable parts of the two or more web application plugins based at least in part on the entry points defined in the metadata.

20. The method of claim 18 wherein registering the two or more web application plugins in the web application comprises utilizing a global plugin manager of the web application:

to read metadata of the two or more web application plugins, the metadata specifying patterns and replacement for generating paths to the defined linkable parts of the two or more web application plugins; and to generate links to the defined linkable parts of the two or more web application plugins based at least in part on the patterns and replacements in the metadata.

* * * * *